July 9, 1957 D. W. MILLER ET AL 2,798,563
PROPELLER CONTROL
Filed Feb. 2, 1952 6 Sheets-Sheet 1

INVENTORS
DALE W. MILLER
VIRGIL BATTENBERG
Willis, Kanleman and Fehr
THEIR ATTORNEYS

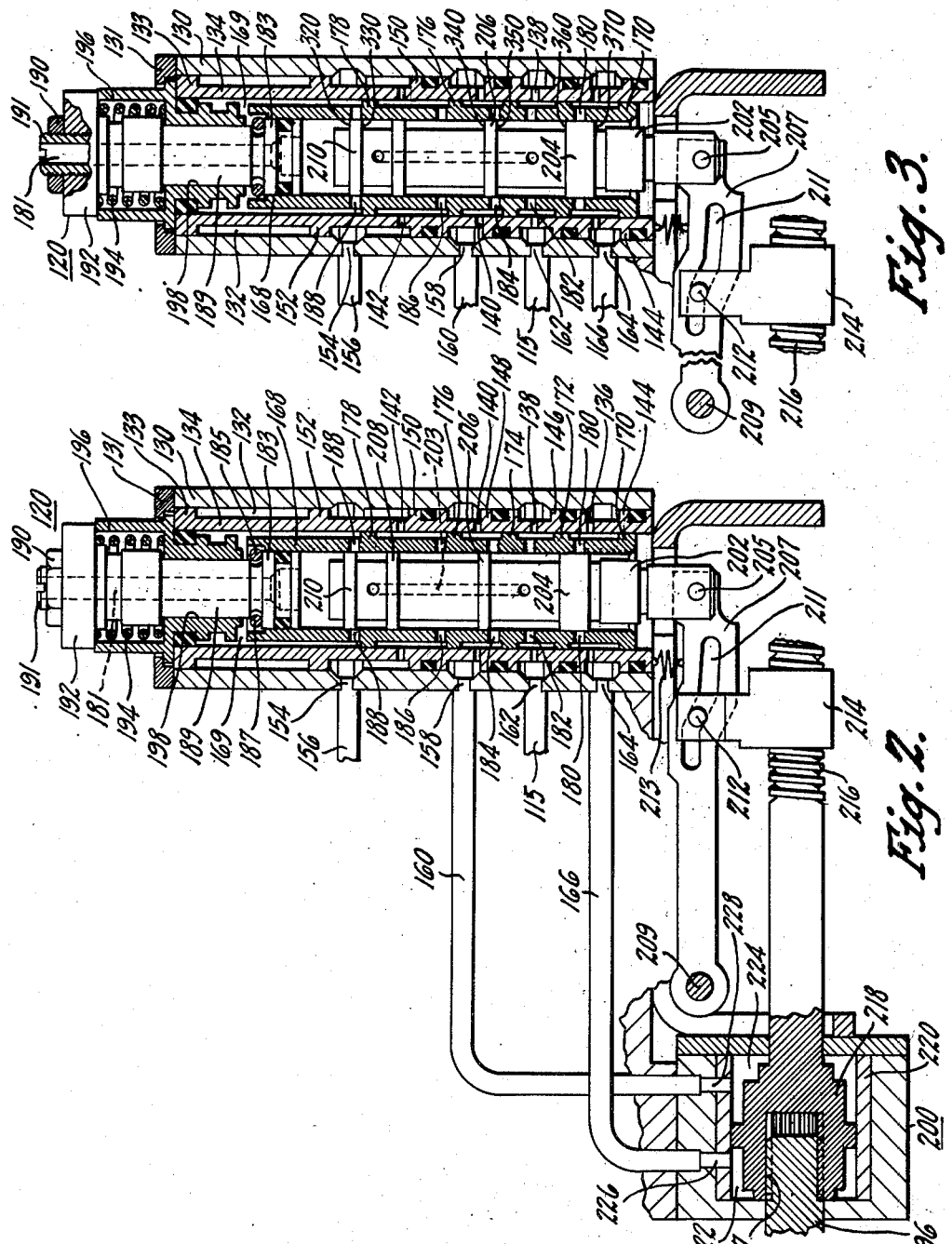

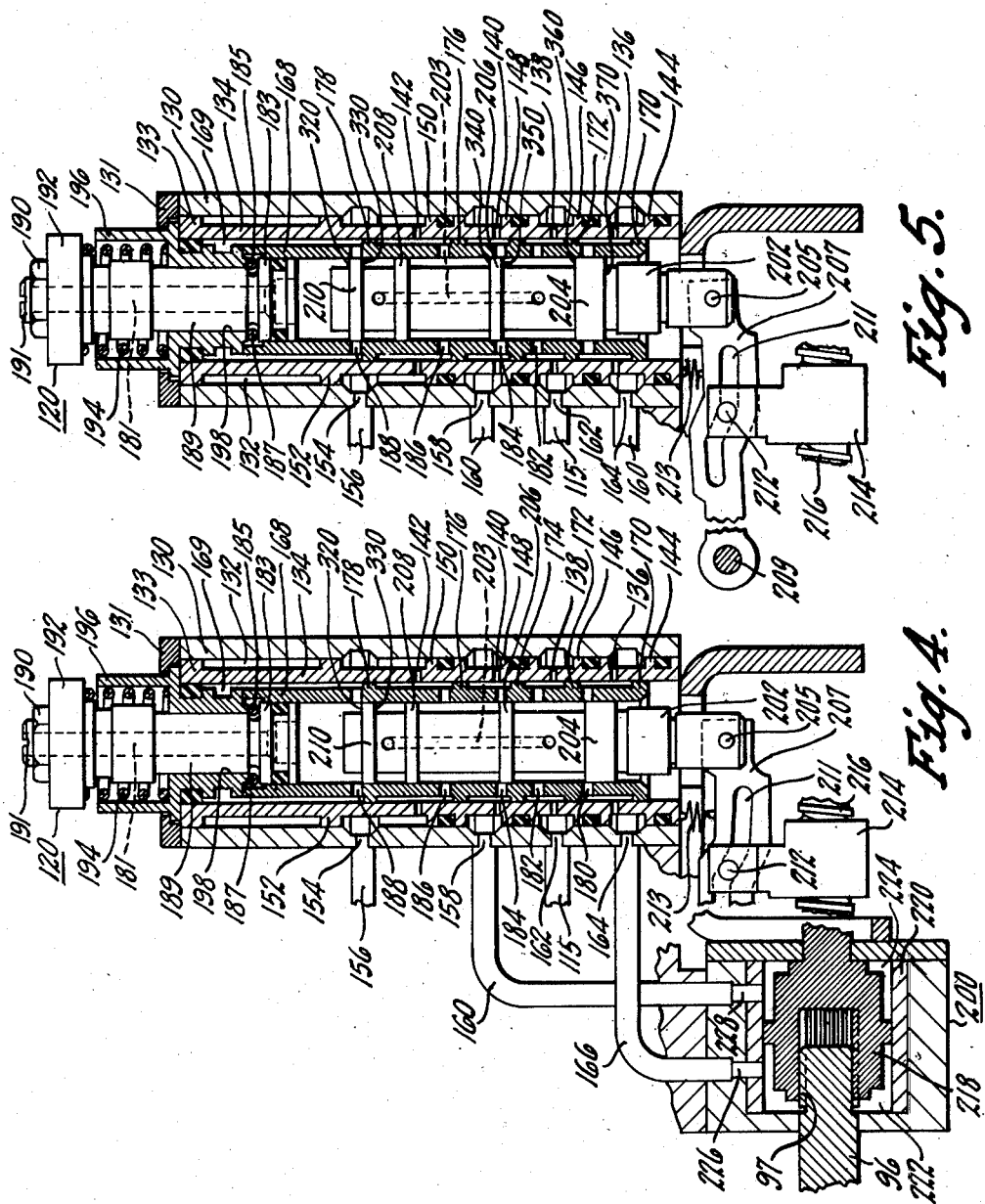

INVENTORS
DALE W. MILLER
BY VIRGIL BATTENBERG

ATTORNEY

INVENTORS
DALE W. MILLER
BY VIRGIL BATTENBERG

ATTORNEY

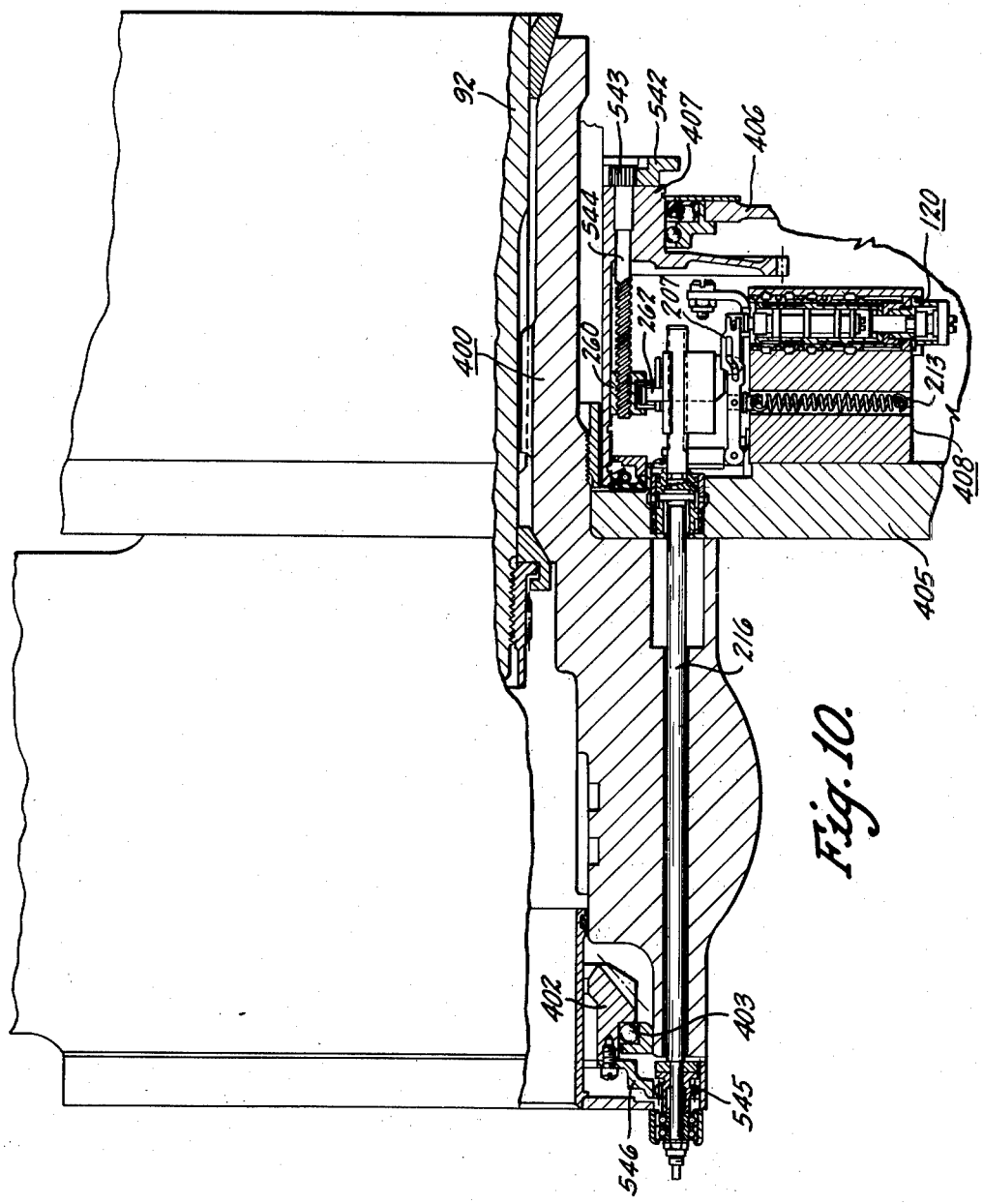

United States Patent Office 2,798,563
Patented July 9, 1957

2,798,563

PROPELLER CONTROL

Dale W. Miller, Brookville, and Virgil Battenberg, Dayton, Ohio, assignors to General Motors Corporation, Detroit, Mich., a corporation of Delaware Application February 2, 1952, Serial No. 269,672

21 Claims. (Cl. 170—160.21)

The present invention relates to a fluid pressure system and more particularly to a fluid pressure system for selectively controlling the movements of a variable load device by means of a fluid servomotor between different predetermined limits.

When an aircraft is in flight, the angular movements of blades of a variable pitch propeller must be limited to a low angle that provides sufficient thrust to maintain the aircraft self-sustaining in the air. However, when the aircraft is on a landing surface, the minimum safe low angle of the blades in flight conditions may produce too great a propulsive force tending to move the aircraft. Hence, it is desirable to provide means for obtaining angular movements of the blades to a lower angle setting to enable the prime mover governing apparatus to be tested for sensitivity when the aircraft is on a landing surface. Accordingly, one of our objects is to provide a fluid pressure system adapted for use with a variable pitch propeller in which the fluid pressure system incorporates means selectively enabling blade movement to be limited by stop means to either of two low angle settings.

The aforementioned and other objects are accomplished by providing a fluid pressure system including governor operated valve means that control the flow of fluid to and from fluid actuated motors for adjusting the blade angle to maintain a selected speed of propeller operation.

Further, mechanism is provided for positioning a part of the governor operated valve means so that it controls the fluid flow to the motors in a manner tending to increase the angular setting of the blades irrespective of the demand for a decrease angular setting called for by the governor if an angle less than either of the predetermined low angular settings has been reached by the blades. Specifically, the fluid pressure system includes a source of fluid pressure, a fluid motor for adjusting the angular setting of the blades and two valve controlled paths between the pressure source and the blade actuating motors for controlling the flow of fluid to and from the motors. One of the paths between the pressure source and the fluid motor includes an overspeed governor valve, an underspeed governor valve, a distributor valve and a selector valve. The overspeed governor valve establishes the high speed limit of the governing range and the underspeed governor valve establishes the low speed limit of the governing range. The distributor valve is used to control the flow of fluid to and from the blade actuating motor when blade angle control without governing is desired. The selector valve is used to determine whether the distributor valve or the overspeed and underspeed governor valves will control the flow of fluid to and from the blade actuating motor. The other path between the pressure source and the fluid motors includes a solenoid operated valve which is used as a precise control of propeller operation between the speed limits determined by the overspeed and underspeed governor valves. The governor operated valve means includes the overspeed and underspeed governor valves and the solenoid operated valve.

A feedback mechanism associated with the propeller blades is utilized to actuate both of the low pitch stops. The feedback mechanism includes a shaft rotated by the blades during angular movements thereof and means for translating rotary movement of this shaft into lineal movement of a member. Thus, the position of this member is indicative of the pitch angle, or position, of the propeller blades. A coupling having relatively movable parts is positioned between the rotary shaft and the movement translating means. The lineally movable member is operatively associated with the overspeed and underspeed governor valves and positions these valves so that they will control the flow of fluid to the motors in a manner tending to increase the angular setting of the blades if an angle less than either of the low angle settings has been reached by the blades. Thus the fluid low pitch stops are established. The coupling having relatively movable parts is used to determine which of the low angle blade settings will cause the member to position the overspeed and underspeed governor valves. Moreover, the coupling constitutes means for varying the position of the member independent of a comparable change in the pitch position of the propeller.

The coupling includes a servo cylinder having a piston movable between predetermined limits. When the piston is moved to one of its limit positions, the member will position the overspeed and underspeed governor valves when the minimum low safe angle for flight conditions has been reached by the blades. When the piston is moved to the other of its limit positions, the member will position the overspeed and underspeed governor valves when the low angle suitable for ground operation has been reached by the blades. Movement of the piston is under control of a valve assembly which controls the fluid flow from a reduced pressure source to opposite sides of the piston.

The valve assembly is actuated by the blade feedback mechanism. The pilot may select either of the pitch stops by movements of a control lever. The control lever has a range of movement for blade angle control and a range of movement for governed speed control. When the control lever is in the governed speed range, the solenoid valve is energized and the selector valve is positioned to block the connections from the distributor valve to the fluid motor and to open the connections between the overspeed and underspeed governor valves and the motor. When the control lever is in the blade angle control range, the solenoid valve is deenergized and the selector valve is positioned to open the connections between the distributor valve and the motor and to block the connections between the overspeed and underspeed governor valves and the motor. When the pilot selects a predetermined low angle blade setting in the blade angle control range below the flight low pitch stop, the distributor valve is actuated to control the flow of fluid to and from the motors so that the low angle selected by the pilot will be obtained by the blades. When this selected low angle has been reached by the blades, the feedback mechanism will have actuated the valve assembly so that it directs the flow of fluid to the servo cylinder to move the piston to a position establishing the predetermined ground low pitch stop. The pilot may now move the control lever back into the governing range. The blades may then be moved under the control of the governor valve means to the ground low angle setting before the member will position the overspeed and underspeed governor valves so that these valves will control the flow of fluid to the motor in a manner tending to increase the angular blade setting. Thus, the fluid ground low pitch stop is established. During take-off of the aircraft, the pilot will move the control lever to a point in the governing range resulting in a blade angle setting substantially above the flight low pitch stop. The feedback mechanism, actuated by the blades, will then actuate the valve assembly so that it directs fluid flow to and from the servo cylinder to move the piston to a position establishing the minimum safe low angle under flight conditions. Under flight conditions, should the governor operated valve means demand a reduced blade angle to maintain the selected speed, the blades will not be able to move to a position below the minimum safe low angular setting. If the blades do reach an angle setting lower than the minimum safe low flight angle, the lineally movable member actuated by the feedback mechanism will position the overspeed and underspeed governor valves so that they control the fluid flow to the blade motor in a manner tending to increase the blade angle. Thus, the fluid flight low pitch stop is established.

Further objects and advantages of the present invention will be apparent from the following description, reference being had to the accompanying drawings, wherein a preferred embodiment of the present invention is clearly shown.

In the drawings:

Fig. 2 is an enlarged view of the dual low pitch valve assembly and the dual low pitch servo cylinder and piston with the component parts shown in the flight low pitch position.

Fig. 3 is an enlarged fragmentary view of the dual low pitch valve assembly with the component parts in position to establish the ground low pitch stop.

Fig. 4 is an enlarged view similar to that of Fig. 2 with the component parts shown in the ground low pitch position.

Fig. 5 is a view similar to Fig. 3 with the component parts in position to establish the flight low pitch stop.

Fig. 10 is a fragmentary enlarged view, partly in section and partly in elevation, taken along line 10—10 of Fig. 7.

Figure 1:
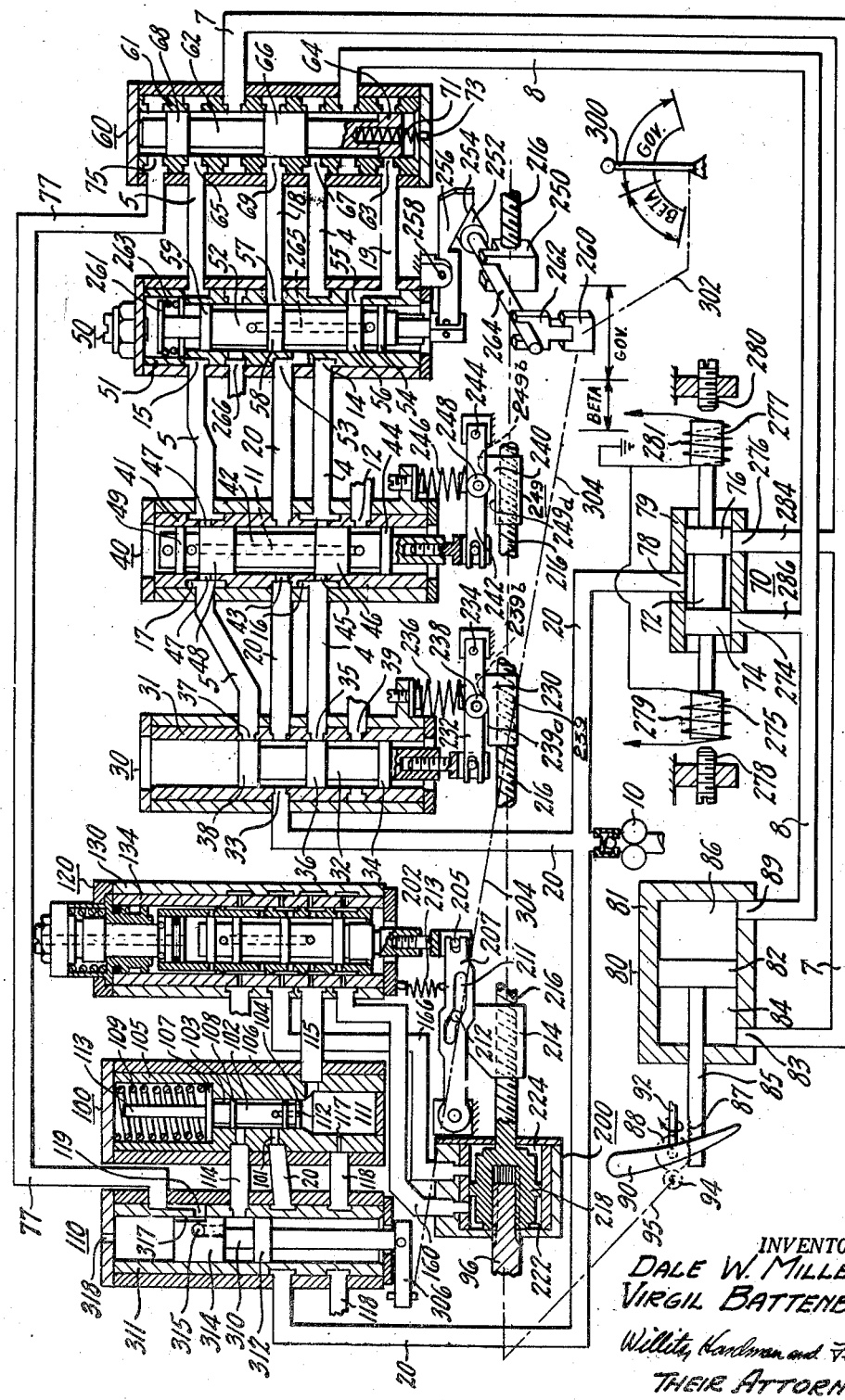
Fig. 1 is a schematic view of the fluid pressure system of the present invention with the mechanism positioned at an angle slightly higher than the flight low pitch stop position.

Referring more particularly to Fig. 1 of the drawings, system pump 10 operates continuously during propeller rotation and supplies fluid under pressure to trunk line 20. Trunk line 20 is provided with a branch supplying fluid under pressure to an overspeed governor valve 30, an underspeed governor valve 40, and a distributor valve 50. A second branch of trunk line 20 supplies fluid under pressure to solenoid valve 70 and a third branch of trunk line 20 supplies fluid under pressure to a pressure reducer valve 100. During propeller operation in the governed speed regime, fluid under pressure from trunk line 20 may be applied to blade actuating servomotor 80 through either of two paths separately, or through both of the paths concurrently. One of the paths between trunk line 20 and servomotor 80 includes the overspeed governor valve 30, the underspeed governor valve 40, and a selector valve 60, while the other path includes the solenoid valve 70. Servomotor 80 is provided with a cylinder 81 having a piston 82 therein which divides the cylinder into an increase pitch chamber 84 and a decrease pitch chamber 86. Piston 82 is connected by a rod 85 to a rack 87 that meshes with a pinion gear 88 which is secured to a propeller blade 90. It is to be understood that each of the propeller blades can be provided with a similar pitch adjusting mechanism, and that the component parts of the fluid pressure system are mounted in a regulator rotatable with the propeller as disclosed in the Blanchard et al. Patents Nos. 2,307,101 and 2,307,102. Moreover, in accordance with the Blanchard et al. patents, the servomotor 80 may have opposed piston areas which are equal. The propeller blade 90 is rotated by shaft 92 in a direction suggested by the arrow. Movements of the blade 90 are transmitted by means of pinion gears 88 and 94 through mechanical linkage 95 to a rotary feedback shaft 96.

Figure 6:
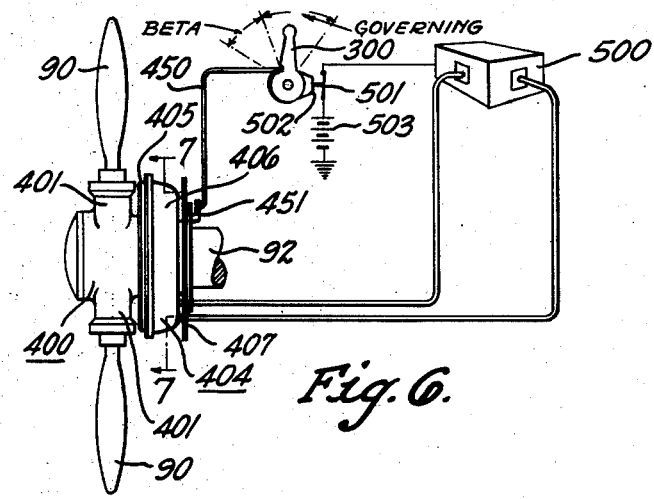
Fig. 6 is a perspective view of a propeller assembly including the low pitch stop means of this invention.

As depicted in Fig. 6, the propeller comprises a hub 400 having a plurality of radially extending blade sockets 401 within which propeller blades 90 are supported for rotation about their longitudinal axes to different pitch positions. In accordance with the aforementioned Blanchard et al. patents, each propeller blade encloses a pitch changing servomotor which is operatively connected thereto and supported by the hub, the pitch changing movements of all blades being coordinated by a master gear 402 operatively connected with all blades and journaled for rotation relative to the hub 400 by a bearing means 403, as shown in Fig. 10.

The propeller hub 400 is operatively connected to and rotated by shaft 92, and a regulator 404 is disposed rearwardly of the hub. The regulator 404 includes a front plate 405 connected to the hub, a cover 406 connected to the front plate, and a stationary adapter assembly 407 which together form an annular reservoir 411 circumscribing a rearwardly extending portion of the propeller hub.

Figure 7:
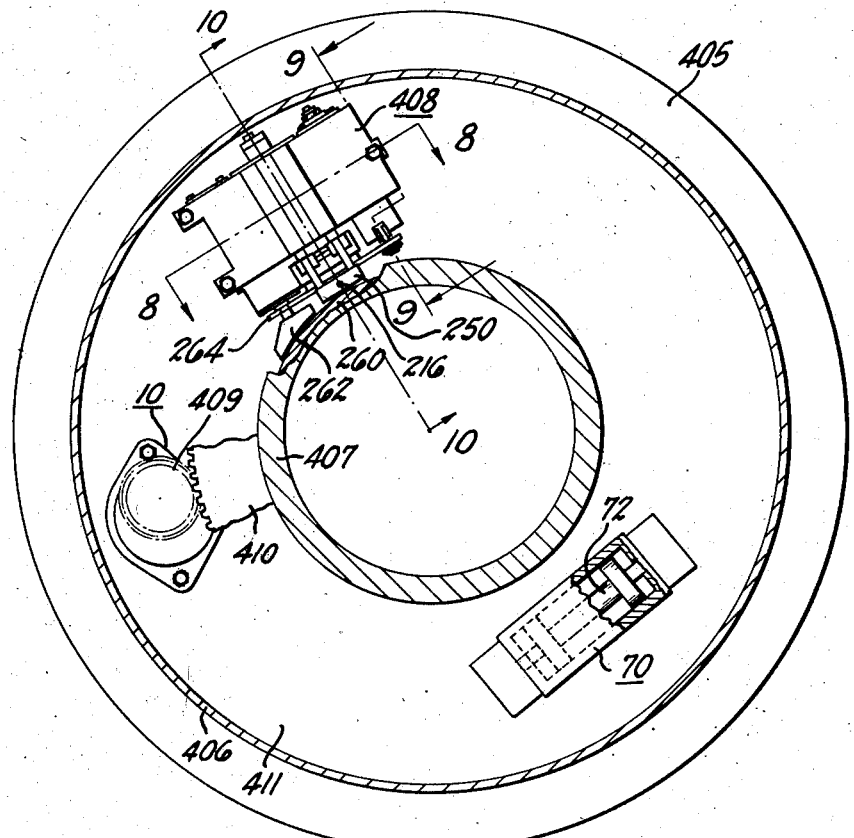
Fig. 7 is an enlarged view, partly in section and partly in elevation, taken along line 7—7 of Fig. 6 showing the components mounted in a regulator.

A valve assembly 408 is mounted on the front plate 405 for rotation therewith, as clearly seen in Fig. 7. The pump 10 and the solenoid valve 70 are also mounted on the front plate 405 for rotation therewith. The pump 10 includes a driving gear 409 that meshes with a stationary power gear 410 integral with the adapter assembly 407 so that upon rotation of the regulator front plate 405, the pump will rotate about the adapter assembly, thereby rotating gear 409 so as to draw oil from the reservoir 411 and supply oil under pressure to the fluid pressure system. The pump driving arrangement is conventional in the art, as shown in the Richardson Patent 2,612,958.

Figure 8:
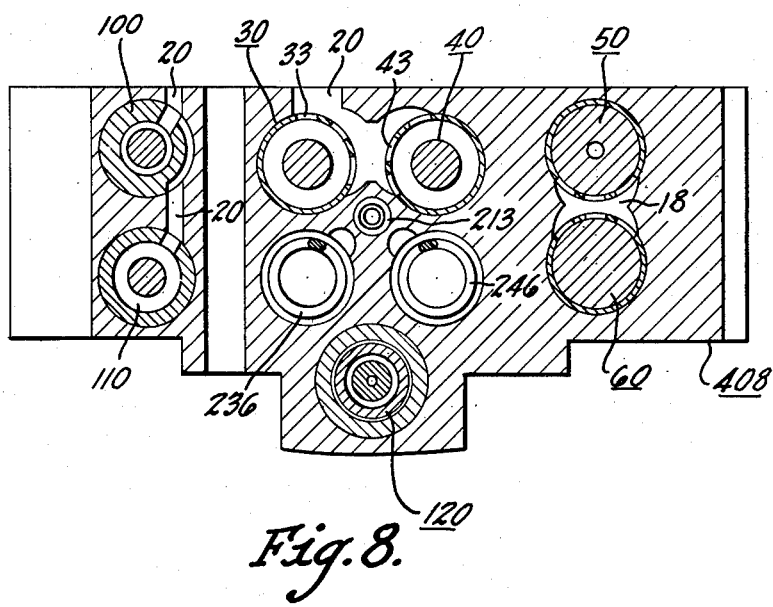
Fig. 8 is an enlarged sectional view of the valve assembly taken along line 8—8 of Fig. 7.

As seen particularly in Figs. 7 and 8, the valve assembly includes the overspeed governor valve 30, the underspeed governor valve 40, the distributor valve 50, the selector valve 60, the pressure reducer valve 100, the rotary piston valve 110 and the dual low pitch valve assembly 120. All of these valves are disposed in substantially radially extending bores of the valve assembly housing so as to respond to centrifugal force. It should be noted that the solenoid valve 70 is mounted at right angles to the direction of centrifugal force, and, hence, the operation of the solenoid valve plunger 72 is not effected by rotation of the regulator front plate 405.

Pressure reducer valve 100 is supplied with fluid under pressure from a branch of trunk line 20 through port 101. The pressure reducer valve comprises a plunger 102, having spaced lands 104, 106 and 108, mounted in chamber 103 of valve casing 105. One end of the plunger 102 is provided with an annular flange 107, and a spring 109 positioned between the flange and an end wall of chamber 103 normally urges the plunger to a position where land 106 will not restrict the flow of fluid through port 101. Land 104 at the other end of the plunger 102 is exposed to fluid pressure in chamber 111 of valve casing 105. Fluid pressure is communicated to chamber 111 from port 101 through an axial passage 112 in the plunger 102. The combined forces of centrifugal force and the pressure in chamber 111 tend to urge the plunger 102 upwardly as opposed by the force of spring 109. Annular flange 107 limits the downward movement of plunger 102 and an extension 113 of plunger 102 limits the upward movement thereof. During propeller operation, plunger 102 will assume an equilibrium position under the opposing forces of spring 109 and the combined forces of centrifugal force and the pressure in chamber 111, where land 106 will partially restrict the flow of fluid and reduce the pressure of fluid flowing through port 101. This reduced pressure is communicated through passage 114 to a rotary piston valve 110. Reduced pressure is also communicated to chamber 111 through passage 112 where it is supplied through passage 115 to the dual low pitch valve 120. Chamber 111 is also provided with an orifice 117 which allows a constant flow of reduced pressure through passage 118 to drain.

Referring more particularly to Fig. 2 of the drawings, the dual low pitch valve assembly 120 will be described in detail. The dual low pitch valve assembly 120 is housed in casing 130 having a bore 132 therethrough. Within bore 132 is mounted a stationary valve guide 134 provided with a series of spaced ports 136, 138, 140 and 142 and spaced lands 144, 146, 148, 150 and 152. The annular channel between lands 150 and 152 of the stationary valve guide 134 communicates through port 154 to a line 156 which is connected to drain. The series of ports designated by 142 in valve guide 134 also communicate with the annular channel between lands 150 and 152. The annular channel between lands 148 and 150 communicates with port 158 and line 160 which leads to a dual low pitch servo 200. The series of ports designated by 140 in valve guide 134 also communicate with the annular channel between lands 148 and 150. Reduced pressure fluid from pressure reducer valve 100 is supplied through line 113 to port 162 which communicates with the annular channel, and the series of ports designated by 138, between lands 146 and 148 of the valve guide 134. The annular channel between lands 144 and 146 communicates with port 164 and line 166 which also connects with the dual low pitch servo 200. The series of ports designated by 136 also communicate with the annular channel between lands 144 and 146.

Within the bore of valve guide 134 is mounted a movable valve sleeve 168 having spaced lands 170, 172, 174, 176 and 178. A series of ports 180 communicate with the annular channel between lands 170 and 172 and with ports 136 of the valve guide; a series of ports 182 communicate with the annular channel between lands 172 and 174 and with ports 138 of the valve guide; a series of ports 184 communicate with the annular channel between lands 174 and 176 and with ports 140 of the valve guide; a series of ports 186 communicate with the annular channel between lands 176 and 178 and with ports 142 of the valve guide; and a series of ports 188 communicate with the annular channel above land 178. Within the upper end of sleeve 168, as viewed in the drawings, a piston 183 contacts the inner peripheral walls of sleeve 168 in fluid-tight engagement. A pair of pins 185 and 187 secured to the sleeve 168 provide an articulated coupling between the sleeve and the piston. The piston is connected by means of rod 189 in sealing engagement with bore 198, hollow threaded member 191 and nut 190 to an annular flange member 192, as is shown in Fig. 3. A compression spring 194 is positioned between the lower surface of flange member 192 and an inner surface of cup-shaped member 196. Cup-shaped member 196 is stationary, and is secured between annular flange 133 of valve guide 134 and annular flange 131 of the casing 130. The cup-shaped member 196 is provided with an axially extending hollow portion 198 which provides a stop limiting the upward movement of valve sleeve 168. Downward movement of the valve sleeve 168 is limited by the engagement of flange member 192 with member 196. The limits of movement of sleeve 168 can be varied through adjustment of the nut 190. The piston 183, the rod 189 and the threaded member 191 are provided with an axial passage 181 that connects the space below piston 183 to drain.

Also mounted within the bore of valve sleeve 168 is a movable plunger 202 having spaced lands 204, 206, 208 and 210. An axial passage 203 connects the annular channels between lands 204 and 206, and lands 208 and 210, respectively. Land 204 cooperates with ports 180 of the sleeve valve; land 206 cooperates with ports 184 of the sleeve valve; and land 210 cooperates with ports 188 of the sleeve vlave. The plunger 202 is pivotally connected at 205 to one end of a lever 207. The other end of lever 207 is pivoted at 209. Intermediate its ends, lever 207 is provided with a cam slot 211. Within cam slot 211, a follower 212, rigidly attached to carriage 214, is adapted to be moved. A tension spring 213 maintains the lower surface of cam slot 211 in engagement with follower 212. Carriage 214 has a threaded connection with high lead screw 216, and upon rotation of lead screw 216, carriage 214 will move lineally. Thus, the high lead screw threaded into carriage 214 translates rotary movement of shaft 96 into lineal movement of carriage 214. Lead screw 216 is rigidly attached to piston 218 of the dual low pitch servo 200. Rotary feedback shaft 96 is provided with straight splines 97 effecting a slidable connection to piston 218. Piston 218 is mounted in cylinder 220 and divides the cylinder into a ground low pitch chamber 222 and flight low pitch chamber 224. The flight low pitch chamber 224 is provided with a port 228 that communicates with line 160, and ground low pitch chamber 222 is provided with a port 226 that communicates with line 166. The dual low pitch servo 200 is a coupling for transmitting movement of feedback shaft 96 to high lead screw 216. The operation of the dual low pitch valve and the dual low pitch piston in establishing either a flight low pitch stop or a ground low pitch stop will be described in detail later.

Referring again to Fig. 1 of the drawings, high lead screw 216 also threadedly engages carriage 230 associated with the overspeed governor valve 30; carriage 240 associated with the underspeed governor valve 40; and yoke 250 associated with the distributor valve 50. The overspeed governor valve 30 is housed in valve guide 31 and comprises a plunger 32 having spaced lands 34, 36 and 38. The plunger 32 has a pivotal connection to one end of a lever 232, the other end of the lever being pivoted at 234. Intermediate its ends, lever 232 is engaged by a compression spring 236 which urges lever 232 to a position where roller 238 will be maintained in engagement with the cam surface 239 of carriage 230. The cam surface 239 includes a flat portion 239a and an inclined portion 239b. The inclined portion 239b is normally disposed out of the path of movement of the roller 238 when the propeller blades 90 are at an angle above the low pitch stop position. The valve guide 31 is provided with a pressure supply port 33, control ports 35 and 37 which cooperate respectively with lands 36 and 38, and a drain port 39 that communicates with the annular channel between lands 34 and 36. The overspeed governor valve is set for the high speed limit of the governed speed regime by adjustment of spring 236, and due to the greater widths of lands 36 and 38, than the control ports 35 and 37, this valve does not respond to small overspeed errors. Moreover, plunger 32 cannot act as an underspeed governor valve since the engagement of roller 238 with the flat portion 239a of the cam surface 239 limits the downward movement of plunger 32 so that it cannot apply fluid pressure from port 33 to port 35. When the high speed limit is reached by the propeller, centrifugal force will have overcome the force of spring 236 to an extent so that pressure from trunk line 20 is supplied through ports 33 and 37 through line 5, by-passing the underspeed governor 40 and the distributor valve 50, to port 65 of the selector valve 60. The selector valve 60 comprises a plunger 62 mounted in casing 61 having spaced lands 64, 66 and 68. Land 64 cooperates with port 63 of the selector valve; land 66 cooperates with ports 67 and 69 of the selector valve; and land 68 cooperates with port 65 of the selector valve. During propeller operation in the governed speed regime, the plunger 62 will assume the position shown in the drawings under the urge of centrifugal force acting on the plunger and assisted by the force of spring 71. The chamber below the land 64 is provided with a passage 73 that leads to drain, and the chamber above the surface of land 68 is provided with a port 75 that communicates with line 77 and port 119 of the rotary piston valve 110. When the selector valve plunger 62 is in the position shown in Fig. 1 of the drawings, the annular channel between lands 66 and 68 will connect port 65 to line 7 leading to the increase pitch chamber 84 of the blade actuating motor 80.

The underspeed governor valve 40 comprises a plunger 42, mounted in valve guide 41, having spaced lands 44, 46, 48 and 49. Valve guide 41 is provided with a series of spaced ports 45 which cooperate with land 46; a series of ports 43 which cooperate with the annular channel between lands 46 and 48; and a series of ports 47 which cooperate with land 48. The plunger 42 is further provided with an axial passage 11, which connects the annular channel between lands 44 and 46 with the annular channel between lands 48 and 49. Port 12, which is connected to drain, also communicates with the annular channel between lands 44 and 46. The plunger 42 is pivotally connected to one end of lever 242, the other end of the lever being pivoted at 244. Intermediate the ends of lever 242, a spring 246 maintains a roller 248, attached to the lever, in engagement with cam surface 249 of the carriage 240. Likewise, the cam surface 249 includes a flat portion 249a and an inclined portion 249b. The inclined portion 249b is normally disposed out of the path of movement of the roller 248 when the propeller blades 90 are at an angle above the low pitch stop. The underspeed governor valve is set for the low speed limit of the governed speed regime by adjustment of spring 246, and cannot act as an overspeed governor valve by reason of the greater width of land 48 as compared to the width of ports 47. In Fig. 1, the propeller blades 90 are positioned only slightly higher than the flight low pitch stop angle of positive 10°. During normal flight, the propeller blades assume a cruise angle, for example, of positive 45° and the cams 239 and 249 are then located to the right of the position depicted in Fig. 1. In particular, the cam 249 is moved to the right as the blade angle of the propeller blades increases in a positive direction so that when the blades are at a cruise angle, the roller 248 is located above the flat 249a of the cam to permit downward movement of the plunger 42 by the spring 246 during propeller underspeeding greater than a predetermined magnitude. Moreover, due to the width of lands 46 and 48 being greater than the width of ports 45 and 47, respectively, the plunger 42 will likewise not respond to small deviations from the selected speed setting. However, when the low speed limit is reached, the force of spring 246 acting on lever 242 overcomes the thrust of centrifugal force tending to urge the plunger upwardly, and the plunger will reach a position allowing fluid pressure at port 43 to be communicated to port 45. This downward movement of the plunger 49 is permitted when the roller 248 is disposed above the flat portion 249a of the cam surface 249. Port 45 is connected to line 4 and communicates with port 67 of the selector valve 60. When the selector valve is in the position shown in Fig. 1 of the drawings, port 67 communicates with line 8 that leads to the decrease pitch chamber 86 of the blade actuating motor 80. Lines 4 and 5, which connect the overspeed and underspeed governor valves with the selector valve 60, by-pass the distributor valve 50 by reason of grooves 14 and 15 in the valve guide 51 of the distributor valve. Fluid lines 4 and 5 leading from the overspeed governor valve 30 to the selector valve 60, likewise, by-pass the underspeed governor valve by reason of grooves 16 and 17 in the valve guide 41. Trunk line 20 supplies fluid under pressure to the supply ports 33 of the overspeed governor valve, 43 of the underspeed governor valve, and 53 of the distributor valve by reason of the annular channels between the lands of the overspeed and underspeed governor valve plungers.

The solenoid valve 70 comprises a plunger 72 having spaced lands 74 and 76 that cooperate with control ports 274 and 276, respectively. The plunger is mounted in valve guide 79 provided with a supply port 78 that is connected to trunk line 20. The ends of the plunger 72 are provided with armatures 275 and 277, respectively. Armature 275 is actuated by solenoid winding 279, and armature 277 is actuated by solenoid winding 281. The solenoid windings 279 and 281 are energized by an outside governing system, depicted by numeral 500 in Fig. 6, and when these windings are alternately energized, the plunger 72 will be moved between the limits defined by stops 278 and 280. The solenoid valve 70 operates as a precise control of propeller operation within the speed limits established by the overspeed and underspeed governor valves. The solenoid valve, the overspeed governor valve and the underspeed governor valve, combined, represent the governor operated valve means which control propeller operation in the governed speed regime. Control ports 274 and 276 of the solenoid valve are connected by lines 284 and 286 to lines 7 and 8, respectively, lines 7 and 8 being connected to ports 83 and 89, respectively, of the servomotor 80.

The regime of propeller operation is selected by a manual control lever 300 located in the cockpit of the aircraft. The lever 300 has a range of movement in the governed speed rigme and a range of movement in the blade angle control or beta regime. When the pilot moves the lever 300 from the governed speed regime to the beta regime, the solenoid valve 70 is rendered inoperative by a switch 501 actuated by a cam 502 when the lever 300 is moved into the beta regime, thereby disconnecting the governor 500 from a source of electric power 503. Movement of lever 300 also actuates mechanical linkages 302 and 304. Linkage 302 is connected to a control ring 260, and control ring 260 is connected by linkage 304 to bell crank arm 306. Control ring 260, when moved by the linkage 302, causes movement of yoke 262. Yoke 262 acts on one end of floating lever 264. A second yoke 250, actuated by the high lead screw 216, acts on floating lever 264 intermediate its ends. The other end of the floating lever 264 is provided with a cam follower 252. Lever 256 is pivoted at one end to distributor valve plunger 52 and is pivoted intermediate its ends at 258 to the valve guide 51 of the distributor valve 50.

Figure 9:
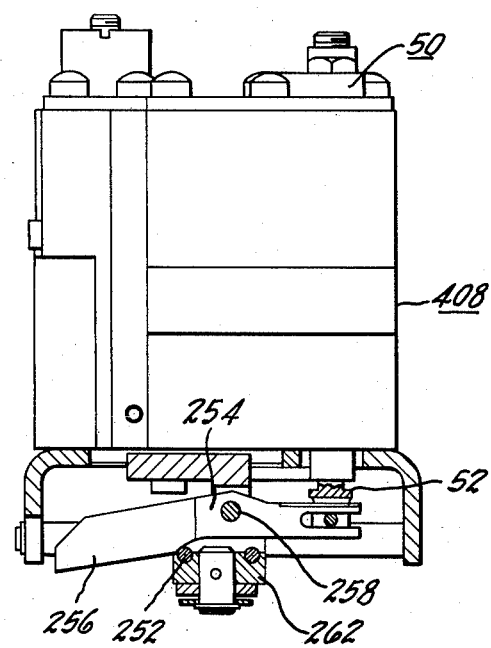
Fig. 9 is an enlarged view, partly in section and partly in elevation, taken along line 9—9 of Fig. 7.

Structurally, the lever 300 is connected by a cable 450 to a regulator lever 451. The lever 451 is attached to an internal ring gear 542 rotatably supported on the stationary adapter assembly 407, the ring gear meshing with a pinion gear 543 attached to a high lead screw 544. The high lead screw 544 is supported for rotary movement relative to the stationary adapter assembly 407. The high lead screw 544 engages the control ring 260, which is movable axially relative to the regulator and disposed within the reservoir 411. The control ring 260 has an annular groove which receives a control shoe 262, the control shoe 262 having a forked end within which one end of the floating lever 264 is disposed. The intermediate point of the lever 264 is pivotally mounted in a slot on the lineally movable yoke member 250 engaged by the rotary feedback high lead screw 216. As seen in Fig. 10, the high lead screw 216 is operatively connected to the master gear 402 through gears 545 and 546. The other end of the lever 264 carries the roller 252, which structurally takes the form of a roller bearing engageable with the cam surface 254 of the lever 256, as structurally shown in Fig. 9.

The distributor valve 50 comprises a valve plunger 52, mounted in a valve guide 51, having spaced lands 54, 56, 58 and 59. Lands 56 and 58 cooperate, respectively, with control ports 55 and 57. The upper end of plunger 52 is provided with an annular flange 261 on which spring 263 acts to thrust the plunger upwardly. Plunger 52 is further provided with an axial passage 265 that connects the annular channel between lands 54 and 56 with the annular channel between lands 58 and 59. The annular channel between lands 58 and 59 is connected to drain through port 266. Spring 263, in urging the plunger 52 upwardly, maintains the cam surface 254 of the lever 256 in engagement with cam follower 252. It is apparent that upon movement of lever 300, control ring 260 will move yoke 262, which in turn will move floating lever 264 about yoke 250 as a fixed pivot. Movement of lever 264 about yoke 250 will cause cam follower 252 to urge the end of lever 256 either upwardly or downwardly depending upon the direction of the movement of yoke 262. When cam follower, attached to the end of lever 264, is moved to the left, as viewed in Fig. 1 of the drawings, lever 256 will pivot about 258 and move the plunger 52 upwardly. When the plunger 52 is moved upwardly, pressure from trunk line 20, supplied to port 53 of the distributor valve, will be communicated to port 57 and line 18 leading to port 69 of the selector valve 60. Conversely, when cam follower 252 is moved to the right, as viewed in Fig. 1 of the drawings, lever 256 will pivot about 258 and move the plunger 52 downwardly. When the plunger 52 is moved downwardly, pressure available at supply port 53 will be communicated through port 55 to line 19 communicating with port 63 of the selector valve 60. However, with the selector valve in the position shown in Fig. 1 of the drawings, lands 64 and 66 prevent communication between lines 7 and 8 and ports 69 and 63, respectively. In order for distributor valve 50 to be operative to control the flow of fluid through lines 7 and 8 to the servomotor 80, the selector valve must be moved so that lands 64 and 66 do not block ports 63 and 69.

In order to move selector valve plunger 62 so that lands 64 and 66 to not block ports 63 and 69, the control lever 300 must be moved into the beta regime which will cause linkage 304 to rotate bell crank 306. Bell crank 306 is connected to rotary plunger 310 mounted in valve guide 311, of the rotary piston valve 110. Plunger 310 is provided with spaced lands 312 and 314, and reduced pressure is supped through line 114 to the annular channel between lands 312 and 314. Land 314 is provided with an axially extending passage 315 that opens into the annular channel between lands 312 and 314 at one end and at the other end opens radially between the end surfaces of land 314. An axially extending groove 317 in land 314 opens above land 314 at one end and at the other end opens radially between the end surfaces of land 314. Valve guide 311 is provided with a port 119 that communicates with the radially extending portion of passage 315 when the plunger 310 is rotated by bell crank 306 and linkage 304 calling for beta control. Port 119 is connected by means of line 77 to port 75 of the selector valve 60.

When the control lever 300 is moved into the beta regime, plunger 310 will be rotated so that fluid under pressure from pressure reducer valve 100 will be communicated through line 114, passage 315, port 119, line 77 and port 75 to the upper surface of land 68 of the selector valve plunger 62. This reduced pressure acting on the upper surface of land 68 will move plunger 62 downwardly, compressing spring 71, to a position where lands 64 and 66 of the plunger will allow communication between ports 63 and 69 and lines 8 and 7, respectively, and lands 66 and 68 will block ports 67 and 65, respectively. When the selector valve is in its downward position, the distributor valve is operative to control the flow of fluid to and from the blade actuating motor 80. When the control lever 300 is moved back into the governed speed regime, linkages 302 and 304 will cause bell crank 306 to rotate plunger 310 to a position where fluid flow between line 114 and port 119 will be blocked by the land 314. When this occurs, the combined forces of the spring 71 and centrifugal force acting on the plunger 62 of the selector valve 60 will move the plunger upwardly causing fluid above land 68 to flow to drain through port 75, line 77, port 119, groove 317 in the land 314 and port 318.

When the distributor valve 50 is controlling the flow of fluid to and from the motor 80, movement of lever 300 calling for a predetermined blade angle will cause movement of control ring 260 and yoke 262 and a corresponding movement of floating lever 264 about yoke 250. Movement of lever 264 will cause a corresponding movement of plunger 52 through the coaction members 252 and 254 and lever 256. As the blade 90 is moved under the control of the servomotor 80, it will actuate feedback linkage 95 and cause a rotary movement of feedback shaft 96 and high lead screw 216. Rotation of high lead screw 216 will cause a lineal movement of yoke 250 which will move lever 264 about yoke 260 as a fixed pivot and re-position the distributor valve plunger 52 so as to cut off fluid flow to and from the motor 80 when the selected blade angle has been reached.

The operation of the fluid system will now be described in connection with Figs. 1 to 5. With the control lever 300 positioned to select a speed of propeller operation in the governed speed regime, the governor operated valve means comprising the overspeed governor valve 30, the underspeed governor valve 40, and the solenoid valve 70 will control the flow of fluid to and from the servomotor 80. During take-off of the aircraft, with the control lever 300 in the governed speed regime from a landing surface, a blade angle, for example, a positive 40° is reached by the blades due to prime mover R. P. M. requirements. With the blade 90 at an angle of this magnitude, the piston 218 of the dual low pitch servo 200 will be in the position shown in Figs. 1 and 2. When the piston 218 is in the position shown in Fig. 2, the low blade angle will be limited by the flight low pitch stop in a manner later to be described.

When the aircraft is air-borne and the prime mover is rotating at a speed equal to the selected governed speed, the solenoid valve 70 will not be directing pressure fluid to the servomotor 80 so as to adjust propeller pitch, since the electrical governor 500 will not actuate the solenoid valve so as to effect pitch adjustment. However, if the propeller speed should differ from the selected governing speed, and the speed difference, or speed error, is between the high speed limit for which the overspeed governor valve 30 is calibrated and the low speed limit for which the underspeed governor valve 40 is calibrated, the electrical governor 500 will actuate the solenoid valve 70 so as to adjust propeller pitch and return propeller speed to the selected governing speed. Assume, for example, that the selected governing speed is 1150 propeller R. P. M., the high speed calibration of the overspeed governor valve 30 is 1300 R. P. M., and the low speed calibration of the underspeed governor valve is 1000 R. P. M. With these assumptions in mind, if the propeller speed should increase to 1200 R. P. M., the electrical governor 500 will actuate the solenoid valve 70 to port pressure fluid from trunk line 20 through port 276, lines 284 and 7, and port 83 to the increase pitch chamber 84 of the servomotor 80, while the decrease pitch chamber 86 thereof is connected to drain through port 89, lines 8 and 286, and port 274. Accordingly, propeller pitch will be increased, thereby increasing the load on the prime mover and causing the propeller speed to be reduced to the selected governing speed of 1150 propeller R. P. M. On the other hand, if propeller speed should decrease to 1100 R. P. M., the electrical governor 500 will actuate the solenoid valve 70 to port pressure fluid from trunk line 20 through port 274, lines 286 and 8, and port 89 to the decrease pitch chamber 86 of the servomotor 80, while the increase pitch chamber 84 thereof is connected to drain through port 83, lines 7 and 284 and port 276. Thus, the propeller pitch will be decreased, thereby decreasing the load on the prime mover and causing propeller speed to return to the preselected governing speed of 1150 propeller R. P. M. From the foregoing, it is apparent that during deviations in the propeller speed from the selected governing speed, which deviations are of less magnitude than 150 propeller R. P. M., the electrical governor 500 will actuate the solenoid valve 70, and the solenoid valve 70 will alone control propeller pitch to return propeller speed to the preselected governing speed.

However, if propeller speed should deviate from the selected governing speed of 1150 propeller R. P. M. by more than 150 R. P. M., the overspeed governor valve 30 will assist the solenoid valve 70 in increasing propeller pitch to return the propeller speed to the selected speed level during overspeeding, while the underspeed governor valve 40 will assist the solenoid valve 70 to return propeller speed to the selected speed level during underspeeding. In other words, the over and underspeed governor valves are connected in parallel flow paths with the solenoid valve 70 to the servomotor 80 during propeller operation in the governing range. Moreover, the solenoid valve 70 has a smaller flow port area than the under and overspeed governor valves. For example, the solenoid valve 70 may have a flow port area, or flow capacity capable of effecting a 2° blade angle change per second, whereas the flow capacity of overspeed and underspeed governor valves may be on the order of 10° blade angle change per second. Accordingly, if the propeller speed should increase to 1350 R. P. M., the electrical governor 500 will actuate the solenoid valve 70 so as to supply pressure fluid to the increase pitch chamber 84 of the servomotor, while the decrease pitch chamber 86 is connected to drain. However, when the speed exceeds 1300 propeller R. P. M., centrifugal force acting on the valve plunger 32 will overcome the opposing force of spring 236 and the plunger 32 will move upwardly so as to supply pressure fluid from trunk line 20 through port 37, line 5, port 65 of the selector valve and line 7 to the increase pitch chamber 84 of the servomotor 80, while the decrease pitch chamber 86 is connected to drain through port 89, line 8, port 67 of the selector valve 60, line 4 and port 39 of the overspeed governor valve 30. Thus, when propeller speed exceeds 1300 R. P. M., the overspeed governor valve 30 and the solenoid valve 70 are connected in parallel flow paths with the servomotor 80 so as to increase propeller pitch so as to reduce propeller speed. Conversely, if the propeller speed should drop to 950 R. P. M., the electrical governor 500 will actuate the solenoid valve 70 so as to supply pressure fluid to the decrease pitch chamber 86 of the servomotor while the increase pitch chamber 84 is connected to drain. At the same time, the thrust of spring 246 will overcome the thrust of centrifugal force on the plunger 42, so that the plunger 42 will move downwardly, thereby supplying pressure fluid from trunk line 20 through port 45, line 4, port 67 of the selector valve 60 and line 8 to the decrease pitch chamber 86 of the servomotor 80, while the increase pitch chamber 84 thereof is connected to drain through line 7, port 65 of the selector valve 60, line 5, port 47 of the underspeed governor valve 40, passage 11 in the plunger 42 and port 12 of the underspeed governor valve 40. Thus, during propeller underspeeding below 1000 R. P. M., the solenoid valve 70 and the underspeed governor valve 40 are connected in parallel flow paths with the decrease pitch chamber 86 of the servomotor 80 so as to reduce propeller pitch and return propeller speed to the selective governing speed level.

Let us now assume that the propeller speed is less than the selected governing speed of 1150 R. P. M., say, for instance, 1050 R. P. M. Under these conditions, the electrical governor 500 will actuate the solenoid valve 70 so as to direct pressure fluid to the decrease pitch chamber 86 of the servomotor 80, while the increase pitch chamber 84 is connected to drain. Thus, propeller pitch will be decreased by the solenoid valve 70 as controlled by the electrical governor 500 in an effort to reduce the load on the prime mover to permit propeller speed to return to 1150 R. P. M. Now assuming that by reason of some prime mover malfunction, propeller speed does not increase, and, thus, propeller pitch is progressively decreased by the solenoid valve 70. As is well recognized in the art, the propeller must not be permitted to move to a pitch angle when the aircraft is air-borne at which negative thrust is developed. In the instant propeller, let us assume that the minimum safe low blade angle when the aircraft is air-borne is a positive 10°. Accordingly, when propeller blades 90 are being moved in a decrease pitch direction, the feedback linkage 95 will cause rotary movement of shaft 96, which is transmitted to high lead screw 216. Movement of the blades 90 in a decrease pitch direction will result in lineal movement of carriages 214, 230 and 240, as well as yoke 250 to the left, as viewed in Fig. 1. It is to be understood that carriages 230 and 240 could be constructed so as to be an integral member. If propeller pitch should decrease below an angle of positive 10°, the feedback shaft 216 will position the carriage 230 so that the inclined portion 239b of the cam surface 239 engages the roller 238 whereby the plunger 32 will be moved upwardly to port pressure fluid from trunk line 20 through port 37, line 5, port 65 of the selector valve 60, and line 7 to the increase pitch chamber 84, while the decrease pitch chamber 86 is connected to drain through line 8, port 67 of the selector valve 60, line 4 and port 39. At the same time, due to propeller underspeeding, the solenoid valve will be applying pressure fluid to the decrease pitch chamber 86, while connecting the increase pitch chamber 84 to drain. However, as alluded to hereinbefore, since the flow capacity of the overspeed governor valve 30 exceeds that of the solenoid valve 70, the overspeed governor valve 30 can override the solenoid valve 70 and prevent a decrease in blade angle substantially below the desired low pitch stop angle. During these conditions, if the propeller continues to underspeed, propeller pitch will hunt, or vary, slightly about a positive 10°. Accordingly, it may be said that the present invention embodies fluid pressure effected stop means, and reference in the claims to fluid pressure effected stop means shall be construed as meaning a stop which is effected by the greater flow capacity of the overspeed governor valve 30 when the electrical governor 500 is calling for a decrease in propeller pitch whereby propeller pitch will hunt about the selected low pitch stop angle. It is pointed out that at the low pitch stop angle, the inclined cam surface 249b of the cam 249 will engage the roller 248 and urge the plunger 42 of the underspeed governor valve upwardly so that lands 48 and 46 will block all fluid flow through their respective control ports 47 and 45.

When the aircraft is on a landing surface, it is often necessary to test the prime mover governing apparatus for sensitivity. However, the minimum safe low angle under flight conditions produces too great a propulsive force tending to move the aircraft when it is on a landing surface. In order to move the blade 90 to a lower angle to allow testing of the governing apparatus, the dual low pitch piston and servo are utilized in the present invention. The dual low pitch stop valve 120 acts as a transmission valve, or device, for shifting the position of the piston 218 in the servo 200. The dual low pitch stop valve 120 shifts the servo piston 218 from the position of Fig. 2 to the position of Fig. 4 when the propeller blades are moved to a predetermined low angle, for instance, positive 5°, and shifts the piston 218 from the position of Fig. 4 to the position of Fig. 2 when the propeller blades are moved from a low angle below a positive 5° above a positive 26°. In order to cause movement of the dual low pitch servo piston 218 from the position shown in Fig. 2 of the drawings to the position shown in Fig. 4 of the drawings, the following sequence of events must transpire. Initially, the control lever 300 must be moved from the governing regime to the beta regime to select a predetermined low blade angle, below the flight low pitch stop angle of 10°. When the control lever is moved to the beta regime, the selector valve will block communication between lines 7 and 8 and the over speed and under speed governor valve and will allow communication between lines 7 and 8 and the distributor valve 50. Coincident with movement of lever 300 into the beta regime, the solenoid valve 70 will be rendered inoperative. When a low blade angle is selected by the pilot in the beta regime, the floating lever 264 will be moved about 250 and cause a downward movement of distributor valve plunger 52. Fluid pressure from trunk line 20 will now be communicated to the decrease pitch chamber 86 of the servomotor 80 through ports 53 and 55 of the distributor valve, line 19, port 63 of the selector valve, and line 8 to port 89 of the servo motor cylinder 81. Fluid from increase pitch chamber 84 of the servomotor will drain through port 83, line 7, port 69 of the selector valve, line 18, port 57, and port 266 of the distributor valve 50. When the predetermined low blade angle has been reached by the blade 90, the feedback mechanism will have rotated high lead screw 216 so that yoke 250 will have repositioned lever 264 and plunger 52 so that lands 56 and 58 of the distributor valve 50 prevent fluid flow to and from the servomotor 80. Rotation of high lead screw 216 will also move carriage 214 to the left, as viewed in the drawings, to the position shown in Fig. 3 of the drawings. Movement of carriage 214 to the position shown in Fig. 3 of the drawings will cause lever 207 to pivot about 209 and move the plunger 202 of the dual low pitch valve assembly downwardly to a position where the upper edge 320 of land 210 starts negative overlap. Henceforth, by negative overlap is meant fluid can flow, and by positive overlap, fluid cannot flow. When edge 320 of land 210 starts negative overlap, fluid may flow from annular chamber 169 through ports 188 and passage 181 to drain. At this time, centrifugal force acting on the sleeve valve 168, combined with the force of spring 194 tending to urge piston 183 and sleeve 168 upwardly, will move the sleeve 168 upwardly. When sleeve 168 is moved upwardly from the position it is shown in Fig. 3 to the position of Fig. 4, edge 350 of land 206 on the plunger 202 will start a positive overlap and edge 340 of land 206 will start negative overlap. At this time, edge 360 of land 204 will start negative overlap, edge 340 of land 206 will have a negative overlap, and edge 370 will have a positive overlap. Chamber 224 of the dual low pitch servo will be connected to drain through port 228, line 160, port 158, ports 140, 184, 186, 142 and 154 to line 156. Dual low pitch servo chamber 222 is supplied with fluid pressure from line 113 through ports 162, 138, 182, 180, 136, 164, line 166 and port 226. The piston 218 will then start moving from the position it is shown in Fig. 2 of the drawings to the position it is shown in Fig. 4 of the drawings. Movement of the piston 218 will cause a corresponding lineal movement of lead screw 216 and carriages 214, 230 and 240 and yoke 250 to the right, as viewed in Fig. 1 of the drawings. Movement of yoke 250 to the right will cause lever 256 to pivot about 258 and move the distributor valve plunger 52 downwardly, thus, causing the distributor valve 50 to control the flow of fluid to the servomotor 80 to further reduce the pitch of the blade 90 below the setting of the control lever 300 in an amount equivalent to the lineal movement of yoke 250. The servo piston 218 and the valve sleeve 168 will come to rest in the position they are shown in Fig. 4 of the drawings. The propeller low pitch stop mechanism is now adjusted for testing the governing apparatus while the aircraft is on the ground. In order to test the governing apparatus, the control lever 300 must be moved back into the governing range to a speed setting within the governing regime and the power setting of the engine controls must be reduced so that the propeller blades will not move in the increase pitch direction above a predetermined positive blade angle, for example, a positive 26°. It is to be understood that the specific blade angles referred to in the description are only by way of example and are not to be construed as limitations. When testing the governing apparatus for sensitivity on the ground, the propeller blade 90 should not be moved above a positive 26° angle since at a positive 26° angle the plunger 202 will cause the servo piston 218 to shift from the position of Fig. 4 to the position of Fig. 2 and to re-establish the flight low pitch stop angle of a positive 10°. However, as long as the servo piston 218 is in the position depicted in Fig. 4, the low pitch stop angle will be lower than the flight low pitch stop angle of 10°, for instance, positive 4°. Accordingly, with the control lever 300 set at a low speed, the operation of the governing apparatus can be tested by comparing the speed of the prime mover as indicated by a tachometer, not shown, with the speed setting of the control lever 300. When the dual low pitch piston is in the ground low pitch stop position shown in Fig. 4 of the drawings, the over speed governor valve 30 will not establish a fluid stop for the blade actuated servomotor 80 until the blade 90 has reached an angle a predetermined amount lower than the flight low pitch stop, as determined by the equivalent blade angle movement of servo piston 218 from the flight low pitch position to the ground low pitch position.

After the governing apparatus has been tested and has been found to be operating satisfactorily, the aircraft is ready for flight. Accordingly, the dual low pitch servo piston 218 must be moved from the position of Fig. 4 to the position of Fig. 2 to re-establish the flight low pitch stop angle of a positive 10°.

In order to move the dual low pitch piston 218 from the position it is shown in Fig. 4 of the drawings to the position shown in Fig. 2 of the drawings to reestablish the flight low pitch stop, the following sequence of events must transpire. The control lever 300 is moved to the selected governing speed for take-off, and the power setting of the engines is increased for take-off. Due to prime mover R. P. M. requirements during take-off of the aircraft, the blades 90 will move in an increase pitch direction above an angle of positive 26°, and in so doing will cause carriage 214 to be moved to the right by high lead screw 216 from the position of Fig. 4 to the position of Fig. 5. When the carriage 214 is in the position depicted by Fig. 5, the cam follower 212 actuates the lever 207 through cam slot 211 and causes the lever 207 to move upwardly about pivot 209. Accordingly, the valve plunger 202 will be moved upwardly to the position of Fig. 5. With the plunger 202 in this position, edge 320 of land 210 starts a positive overlap and edge 330 of land 210 starts a negative overlap. Supply pressure from line 113 will now be available through ports 162, 138, 182, axial passage 203 in the plunger 202 and port 188 to the annular chamber 169 above land 178 of the sleeve 168, and drain through port 188 and passage 181 will be blocked. Supply pressure in chamber 169 will act on the upper surface of land 178 of the sleeve 168 and cause downward movement of the sleeve. A predetermined downward movement of sleeve 168 will cause a negative overlap of edge 350 of land 206 and edge 370 of land 204. At this time edges 340 and 360 of lands 206 and 204, respectively, will have a positive overlap. When the plunger and sleeve are in this position, servo chamber 224 will be connected through line 160 to the supply pressure from line 113, and servo chamber 222 will be connected to drain through line 166. The piston 218 will start moving from the position it is shown in Fig. 4 of the drawings to the position it is shown in Fig. 2 of the drawings. Movement of the piston to the left, as viewed in Fig. 4 of the drawings, will effect the corresponding downward movement of the plunger 202 through carriage 214 and lever 207. The sleeve 168 will move downwardly under the urge of fluid pressure in chamber 169 to the position it is shown in Fig. 2 of the drawings. Lineal movement of lead screw 216 and its associated carriages 214, 230, 240 and yoke 250 will not effect a change in blade angle since fluid flow controlled by the distributor valve is blocked by the selector valve when the control lever is in the governed speed regime. Movements of the blade 90 will now be limited by the flight low pitch stop effected by the over speed governor valve 30 as long as the control lever is maintained in the governed speed regime.

The flight low pitch stop and the ground low pitch stop are only operative to limit blade movement when the control lever 300 is positioned in the governed speed regime. When the aircraft is airborne, the movement of the blades during takeoff will automatically cause the dual low pitch valve and the dual low pitch servo to establish the flight low pitch stop as the limit of blade movement. In order to effect movement of the blades to the ground low pitch stop in the governed speed regime, the pilot must move lever 300 into the blade angle control regime in the manner previously described. Thus, it is apparent that the fluid pressure system of the present invention automatically prevents movement of the blades below the minimum safe low angle for flight unless the pilot voluntarily and deliberately moves the control lever below a predetermined low angle in the blade angle control regime.

While the embodiment of the present invention as herein disclosed, constitutes a preferred form, it is to be understood that other forms might be adopted.

What is claimed is as follows:

1. In a servo system, a source of fluid pressure, a fluid pressure actuated servomotor operatively connected with said source, a variable load device operatively associated with and moved by said servomotor, a feedback mechanism driven by said load device, fluid pressure effected stop means operatively associated with said servomotor and actuated by said feedback mechanism for limiting movement of said load device at any one of a plurality of positions, and a valve assembly operatively associated with said stop means including a plunger actuated by said feedback mechanism, said feedback mechanism including a coupling having relatively movable members, said valve assembly controlling the application of fluid pressure to opposite sides of one of said coupling members to determine the position of said load device at which said stop means will limit movement.

2. In a servo system, a source of fluid pressure, a fluid pressure actuated servomotor operatively connected with said source, a variable load device operatively associated with and moved by said servomotor, a feedback mechanism driven by said load device, fluid pressure effected stop means operatively associated with said servomotor and actuated by said feedback mechanism for limiting movement of said load device at any one of a plurality of positions, a valve assembly operatively associated with said stop means including a sleeve and a plunger, means actuated by said feedback mechanism for moving said plunger, means rendered effective upon movement of said plunger for moving said sleeve, and means actuated by movements of said sleeve and plunger for adjusting said feedback mechanism to determine the position of said load device at which said stop means will limit movement.

3. In a variable pitch aircraft propeller having blades movable within a range of angles during propeller operation in a governed speed regime and a blade angle control regime, the combination including, fluid pressure effected stop means operatively associated with said blades for limiting blade movement in the governed speed regime, feedback means operatively connected with and positioned by said blades including cam means for actuating said stop means to limit blade movement to a predetermined minimum safe low angle when the aircraft is in flight, said feedback means including an adjustable coupling between said blades and said cam means, and means operatively associated with said feedback means for adjusting said coupling to vary the relationship between the blades and said cam means to delay actuation of said stop means so that blade movement is limited to a second lower predetermined angle when the aircraft is on a landing surface.

4. In a variable pitch aircraft propeller having blades movable within a range of angles during propeller operation in a governed speed regime and a blade angle control regime, the combination including, means for selecting the regime of propeller operation, a fluid pressure system for controlling blade movement, fluid pressure effected stop means operatively associated with said blades for limiting blade movement in the governed speed regime, feedback means operatively connected with and positioned by said blades including cam means for actuating said stop means to limit blade movement to a predetermined minimum safe low angle when the aircraft is in flight, said feedback means including an adjustable coupling between said blades and said cam means, and means operatively associated with said feedback means for adjusting said coupling to vary the relationship between the blades and said cam means to delay actuation of said stop means so that blade movement is limited to a second lower predetermined angle when the aircraft is on a landing surface.

5. In a variable pitch aircraft propeller having blades movable within a range of angles during propeller operation in a governed speed regime and a blade angle control regime, the combination including, means for selecting the regime of propeller operation, a fluid pressure system for controlling blade movement, fluid motor means operatively connected with said blades for effecting blade movement, fluid pressure effected stop means operatively associated with said motor means for limiting blade movement in the governed speed regime, feedback means operatively connected with and positioned by said blades including cam means for actuating said stop means to limit blade movement to a predetermined minimum safe low angle when the aircraft is in flight, said feedback means including an adjustable coupling between said blades and said cam means, and means operatively associated with said feedback means for adjusting said coupling to vary the relationship between the blades and said cam means to delay actuation of said stop means so that blade movement is limited to a second lower predetermined angle when the aircraft is on a landing surface.

6. In a variable pitch aircraft propeller having blades movable within a range of angles during propeller operation in a governed speed regime and a blade angle control regime, the combination including, means for selecting the regime of propeller operation, a fluid pressure system for controlling blade movement, fluid motor means operatively connected with said blades for effecting movement thereof, said fluid pressure system including a source of fluid under pressure and governor operated valve means controlling fluid flow to and from said motor means during propeller operation in the governed speed regime, fluid pressure effected stop means operatively associated with said motor means for limiting blade movement in the governed speed regime, feedback means operatively connected with and positioned by said blades including cam means for actuating said stop means to limit blade movement to a predetermined minimum safe low angle when the aircraft is in flight, said feedback means including an adjustable coupling between said blades and said cam means, and means operatively associated with said feedback means for adjusting said coupling to vary the relationship between the blades and said cam means, to delay actuation of said stop means so that blade movement is limited to a second lower predetermined angle when the aircraft is on a landing surface.

7. In a variable pitch aircraft propeller having blades movable within a range of angles during propeller operation in a governed speed regime and a blade angle control regime, the combination including, means for selecting the regime of propeller operation, a fluid pressure system for controlling blade movement, fluid motor means operatively connected with said blades for effecting movement thereof, said fluid pressure system including a source of fluid under pressure and valve means controlling fluid flow to and from said motor means during propeller operation in the governed speed regime, fluid pressure effected stop means operatively associated with said motor means including said valve means for limiting blade movement in the governed speed regime, feedback means operatively connected with and positioned by said blades including cam means for actuating said stop means to limit blade movement to a predetermined minimum safe low angle when the aircraft is in flight, said feedback means including an adjustable coupling between said blades and said cam means, and means operatively associated with said feedback means for adjusting said coupling to vary the relationship between the blades and said cam means to delay actuation of said stop means so that blade movement is limited to a second lower predetermined angle when the aircraft is on a landing surface.

8. In a variable pitch aircraft propeller having blades movable within a range of angles during propeller operation in a governed speed regime and a blade angle control regime, the combination including, manually operable means for selecting the regime of propeller operation, fluid pressure effected stop means operatively associated with said blades for limiting blade movement in the governed blade regime, feedback mechanism operatively connected with and positioned by said blades, including cam means for actuating said stop means to limit blade movement to a predetermined minimum safe low flight angle, said feedback means including an adjustable coupling between said blades and said cam means, and means operatively associated with said feedback mechanism and controlled by movement of said manually operable means to a predetermined position in the blade angle control regime for adjusting said coupling to vary the relationship between the blades and said cam means to delay actuation of said stop means so that blade movement is limited to a second lower predetermined angle.

9. In a variable pitch aircraft propeller having blades movable within a range of angles during propeller operation in a governed speed regime and a blade angle control regime, the combination including, manually operable means for selecting the regime of propeller operation, fluid pressure effected stop means operatively associated with said blades for limiting blade movement in the governed blade regime, feedback mechanism operatively connected with and positioned by said blades including cam means for actuating said stop means to limit blade movement to a predetermined minimum safe low flight angle, said feedback mechanism including an adjustable coupling between said blades and said cam means, said adjustable coupling including relatively movable members, and means operatively associated with said feedback mechanism and controlled by movement of said manually operable means to a predetermined position in the blade angle control regime for adjusting said coupling to vary the relationship between said blades and said cam means to delay actuation of said stop means so that blade movement is limited to a second lower predetermined angle.

10. Means by which the blades of an aircraft propeller may be varied as to pitch automatically with changes in engine speed between different predetermined limits when the aircraft is in flight and when it is on a landing surface, including in combination, a source of fluid under pressure, fluid motor means for adjusting blade angle, governor operated valve means operatively connected between said pressure sources and said fluid motor means for controlling fluid flow to and from said motor means in response to speed changes, feedback mechanism operatively connected with said blades and actuated by movements thereof, cam actuated means operatively associated with said motor means and actuated by said feedback mechanism to limit the lowest blade angle obtainable during flight, said feedback mechanism including adjustable coupling between said blades and said cam actuated means, and manually controlled means operatively associated with said feedback mechanism for adjusting said coupling to vary the relationship between said blades and said blade angle limiting cam actuated means so that a lower blade angle can be obtained when the aircraft is on a landing surface than can be obtained in flight.

11. In a controllable pitch propeller having fluid actuated motor means for adjusting the angle of blades in a governed speed regime, the combination including, a source of fluid under pressure, governor operated valve means operatively connected between said pressure source and said motor means for controlling fluid flow therebetween to adjust blade angle to maintain a predetermined speed of propeller operation, said blade angle being adjustable within a range including a flight low angle and a ground low angle in the governed speed regime, feedback mechanism operatively connected with said blades and actuated by movements thereof, fluid pressure effected stop means operatively associated with said motor means incluling a cam member operated by said feedback mechanism for limiting the low angle obtainable by said blade in the governed speed regime, said feedback mechanism including an adjustable coupling between said blades and said cam member, means normally positioning said coupling so that said cam member limits blade movement to the flight low angle, and manually controlled means operatively associated with said feedback mechanism for adjusting said coupling to vary the relationship between said blades and said cam member to position said member so that it allows blade movement to the ground low angle.

12. Means for establishing either of two low angle settings for blades of an adjustable pitch propeller having fluid actuated motor means for varying the angular setting of the blades, including in combination, a source of fluid under pressure, a control system including a governor operated valve and pitch limiting valve means connected in parallel between said pressure source and said motor means, said governor operated valve controlling fluid flow to and from said motor means to maintain a selected speed, and mechanism for actuating the pitch limiting valve means to effect a fluid pressure stop when either of said low angular settings has been reached by the blades, said mechanism including a shaft rotated by the blades during angular movements thereof, a lineally movable member, means for translating rotary movement of said shaft into lineal movement of said member, said member including means operable to position said pitch limiting valve means to effect said fluid pressure stop, a coupling having relatively movable members disposed between said rotary shaft and said translating means, and means for moving one of said coupling members to establish either of the two low angle settings.

13. The combination set forth in claim 12 wherein the means for translating rotary movement of said shaft into lineal movement of said member includes a high lead screw connected to and rotated by said coupling, said member having threaded engagement with said screw.

14. The combination set forth in claim 12 wherein the means operable to position the pitch limiting valve means includes a cam surface on said member and cam follower mechanism attached to said pitch limiting valve means and engaging said surface, whereby lineal movement of said member will effect movement of said pitch limiting valve means.

15. The combination set forth in claim 12 wherein the coupling having relatively movable members positioned between said rotary shaft and the translating means includes a servo cylinder and piston, said piston having a rotatable connection with said shaft and capable of being moved axially relative thereto.

16. The combination set forth in claim 15 wherein said piston divides the cylinder into two chambers having fluid connections with the pressure source, a valve assembly in the fluid connections between said chambers and the pressure source, and means for positioning said valve assembly to effect a flow of fluid to and from said chambers to establish either of said two low angle settings.

17. A valve assembly for use with a variable pitch propeller having a member operatively connected to and positioned by said propeller, the position of said member being indicative of the pitch position of said propeller, said valve assembly including cooperable, relatively movable parts, one of said parts being operatively connected with said member so as to be positioned thereby, a spring operatively engaging the other of said parts, said other part being controlled by the position of said one part, said spring and the thrust of centrifugal force, and means for varying the position of said member a predetermined amount independent of the pitch position of said propeller, said last recited means being controlled by the relative position of said valve assembly parts whereby said member may occupy at least two different positions for the same pitch position of said propeller.

18. A valve assembly for use with a variable pitch propeller having a member operatively connected to and positioned by said propeller, the position of said member being indicative of the pitch position of said propeller, said valve assembly including cooperable, relatively movable plunger and sleeve elements, said plunger element being operatively connected with said member so as to be positioned thereby, a spring operatively engaging said sleeve element, said sleeve element being controlled by the position of said plunger element, said spring and the thrust of centrifugal force, and means for varying the position of said member a predetermined amount independent of the pitch position of said propeller, said last recited means being controlled by the relative positions of said plunger and sleeve elements whereby said member may occupy at least two different positions for the same pitch position of said propeller.

19. A valve assembly for use with a variable pitch propeller having a member operatively connected to and positioned by said propeller, the position of said member being indicative of the pitch position of said propeller, said valve assembly including cooperable, relatively movable parts, one of said parts being operatively connected with said member so as to be positioned thereby, a spring operatively engaging the other of said parts, said other part being controlled by the position of said one part, said spring and the thrust of centrifugal force, and a servo actuated piston for varying the position of said member a predetermined amount independent of the pitch position of said propeller, said servo actuated piston being controlled by the relative positions of said valve assembly parts whereby said member may occupy at least two different positions for the same pitch position of said propeller.

20. A valve assembly for use with a variable pitch propeller having a member operatively connected to and positioned by said propeller, the position of said member being indicative of the pitch position of said propeller, said valve assembly including cooperable, relatively movable plunger and sleeve elements, said plunger element being operatively connected with said member so as to be positioned thereby, a spring operatively engaging said sleeve element, said sleeve element being controlled by the position of said plunger element, said spring and the thrust of centrifugal force, and a servo actuated piston for varying the position of said member a predetermined amount independent of the pitch position of said propeller, said servo actuated piston being controlled by the relative position of said plunger and sleeve elements whereby said member may occupy at least two different positions for the same pitch position of said propeller.

21. In a variable pitch propeller having blades movable about their longitudinal axes to adjusting the pitch position thereof, means operatively connected with the blades for adjusting the pitch position thereof, and speed governing means operatively associated with said blade adjusting means to maintain propeller speed substantially constant, the combination including, fluid pressure effected stop means operatively associated with the blade adjusting means for precluding movement of said blades below a first predetermined low blade angle when said speed governing means is in operation, feedback mechanism operatively connected with and positioned by said blades including cam means for actuating said stop means, said feedback mechanism also including an adjustable coupling between said blades and said cam means for varying the relationship between the pitch position of said blades and said cam means so as to preclude movement of said blades below a second predetermined low blade angle, and control means operatively associated with said coupling and operatively connected with said blades for automatically adjusting said coupling upon movement of said blades to an angle lower than either the first or second predetermined low blade angles.

References Cited in the file of this patent

UNITED STATES PATENTS

| | | |
|---|---|---|
| 2,402,065 | Martin | June 11, 1946 |
| 2,423,191 | Kopp | July 1, 1947 |
| 2,437,701 | McCoy | Mar. 16, 1948 |
| 2,455,378 | McCoy | Dec. 7, 1948 |
| 2,513,660 | Martin et al. | July 4, 1950 |
| 2,560,914 | Almeras | July 17, 1951 |
| 2,592,124 | Diefenderfer | Apr. 8, 1952 |
| 2,593,910 | Morris et al. | Apr. 22, 1952 |
| 2,612,958 | Richardson | Oct. 7, 1952 |
| 2,640,555 | Cushman | June 2, 1953 |
| 2,652,122 | Longfellow | Sept. 15, 1953 |
| 2,669,312 | Dinsmore et al. | Feb. 16, 1954 |
| 2,699,304 | Treseder et al. | Jan. 11, 1955 |

FOREIGN PATENTS

| | | |
|---|---|---|
| 473,018 | France | Sept. 1, 1914 |
| 600,603 | Great Britain | Apr. 14, 1948 |